D. COLLINS.
Millstone Dress.
No. 19,605.
Patented March 9, 1858.
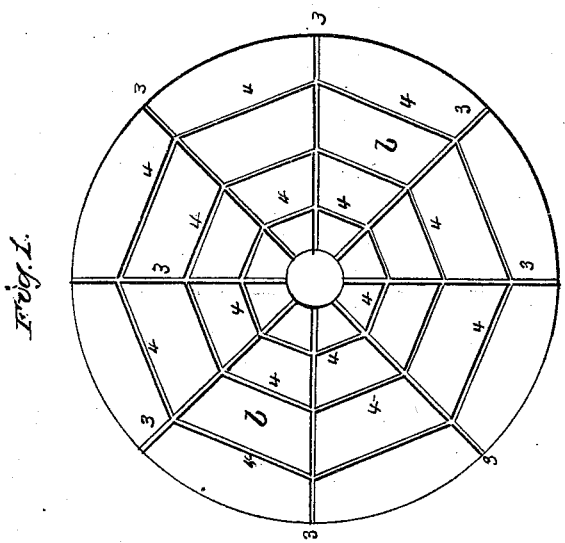
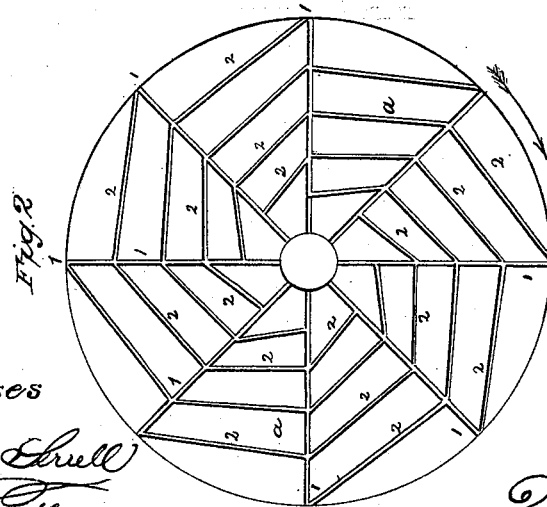

UNITED STATES PATENT OFFICE.

D. COLLINS, OF JERSEY CITY, NEW JERSEY, ASSIGNOR TO HIMSELF AND W. L. HANFORD, OF SAME PLACE.

DRESS OF STONES FOR HULLING-MILLS.

Specification of Letters Patent No. 19,605, dated March 9, 1858.

*To all whom it may concern:*

Be it known that I, DAVID COLLINS, of Jersey City, in the county of Hudson and State of New Jersey, have invented, made, and applied to use a certain new and useful Improvement in the Dress for Hulling-Stones; and I do hereby declare that the following is a full, clear, and exact description of the nature and operation of the same, reference being had to the annexed drawing, making part of this specification, wherein—

Figure 1, is an inverted plan of the runner stone and Fig. 2, is a plan of the bed stone.

In the patent of Charles R. Barnes of Feb. 20 1835, and the improvements thereon of January 26th 1838, a dress for hulling stones is shown, in which both the bed and runner stones are dressed with radial furrows dividing the same into sections, and these sections are provided with curved furrows which are both difficult to dress, and do not in practice operate with the advantageous results that are derived from my dress.

The nature of my said invention therefore does not consist in sections dressed with curved furrows, but it does consist in the use of a runner stone dressed with polygonal and radial grooves, in combination with a bed stone dressed with radial grooves and peculiarly arranged straight grooves connecting the aforesaid radial grooves, and terminating opposite to each other at said radial grooves.

In the drawing *a*, is the bed stone and *b*, is the runner stone, having the eye *c*. These stones are to be sustained, trammed, adjusted and driven in any usual manner.

The bed stone *a*, is dressed with radial furrows 1, 1, dividing the surface into the desired number of sections, I prefer eight: 2, 2, are straight grooves across these sections, passing off nearly at right angles to the radial grooves in the direction (shown by the arrow) in which the runner stone revolves and carries the grain. These grooves 2, 2, intersect the next radial furrow 1, at the side opposite to the points from which the next range of furrows or grooves commences, so that any grains passing through the radial furrows from the eye of centrifugal force can pass from one furrow 2, to the next until it is delivered by the termination of said furrow 2 at the skirt of the stone.

The runner stone is dressed with radial furrows 3, 3, which should correspond in number to those on the bed stone. It is also dressed with polygonal furrows 4, 4, so as to form say three similar polygons dividing the stone up in lines nearly equidistant from each other between the skirt and eye of the stone.

By reference to the drawing the peculiar operation of this dress on the runner and bed stones will be apparent, for the radial grooves allow the grain seed &c. that is being hulled or cleaned, to pass away by centrifugal force from the eye, and the grains &c. are carried into the furrows 2, and 4,— the furrows 2, tend to carry the grains to the skirt of the stone, and the polygonal furrows 4, tend to retain the grains and roll them back and forth in a manner that I find practically does remove almost if not quite all the hulls, floury point of the berry, dust and other foreign matter, without injury to the said berry, in a quicker and more efficient manner than any other mill with which I am acquainted.

I do not claim dressing hulling stones with radial or curved furrows, but

What I claim as my invention and desire to secure by Letters Patent is—

The runner stone, dressed with the radial and polygonal furrows (3 and 4) as specified, when combined with the bed stone having radial furrows 1, 1, and straight furrows 2, 2, or their equivalents, substantially as and for the purposes specified.

In witness whereof I have hereunto set my signature this sixteenth day of February 1858.

DAVID COLLINS.

Witnesses:
LEMUEL W. SERRELL,
THOMAS G. HAROLD.